United States Patent
Afzal et al.

(10) Patent No.: US 11,496,929 B2
(45) Date of Patent: Nov. 8, 2022

(54) METHODS AND SYSTEMS FOR SELECTING A USER PLANE FUNCTION IN A WIRELESS COMMUNICATION NETWORK

(71) Applicant: T-Mobile USA, Inc., Bellevue, WA (US)

(72) Inventors: Muhammad Waqar Afzal, Bellevue, WA (US); Suliman Albasheir, Sammamish, WA (US); Rahul Pal, Bellevue, WA (US)

(73) Assignee: T-MOBILE USA, INC., Bellevue, WA (US)

( * ) Notice: Subject to any disclaimer, the term of this patent is extended or adjusted under 35 U.S.C. 154(b) by 84 days.

(21) Appl. No.: 17/220,611

(22) Filed: Apr. 1, 2021

(65) Prior Publication Data

US 2022/0322150 A1    Oct. 6, 2022

(51) Int. Cl.
  *H04W 28/22*    (2009.01)
  *H04W 8/08*    (2009.01)
  *H04W 28/08*    (2009.01)
  *H04L 101/654*    (2022.01)

(52) U.S. Cl.
  CPC ............ *H04W 28/22* (2013.01); *H04W 8/08* (2013.01); *H04W 28/0983* (2020.05); *H04L 2101/654* (2022.05)

(58) Field of Classification Search
  None
  See application file for complete search history.

(56) References Cited

U.S. PATENT DOCUMENTS

| | | | |
|---|---|---|---|
| 2021/0051529 A1* | 2/2021 | Yuan | H04W 76/11 |
| 2021/0076260 A1* | 3/2021 | Albasheir | H04W 28/10 |
| 2021/0250845 A1* | 8/2021 | Zhu | H04W 28/22 |
| 2021/0345454 A1* | 11/2021 | Dhanapal | H04W 28/0268 |
| 2021/0377807 A1* | 12/2021 | Lee | H04W 4/185 |

* cited by examiner

*Primary Examiner* — Kenny S Lin
(74) *Attorney, Agent, or Firm* — Loeb & Loeb LLP

(57) ABSTRACT

A method for selecting a user plane function when a user equipment (UE) attaches to a wireless communication network may include determining a data throughput limit associated with the UE, identifying a first user plane function having a first data throughput capacity, and identifying a second user plane function having a second data throughput capacity, wherein the first throughput capacity is higher than the second throughput capacity. The method may further include selecting the first user plane function if the data throughput limit of the UE is above a predetermined threshold, selecting the second user plane function if the data throughput limit of the UE is below the predetermined threshold, and sending a session request to the selected first or second user plane function.

20 Claims, 6 Drawing Sheets

METHODS AND SYSTEMS FOR SELECTING A USER PLANE FUNCTION IN A WIRELESS COMMUNICATION NETWORK

TECHNICAL FIELD

Embodiments discussed herein generally relate to methods and systems for selecting a user plane function when a user equipment (UE) attaches to a wireless communication network.

BACKGROUND

The fifth generation (5G) technology standard for wireless networks offers faster speeds, greater throughput, and ultra-low latency compared with earlier generations. A 5G network may include the user equipment (UE), the access network including the base station (gNodeB), and the core network. When a UE attempts to attach to a 5G network, the UE may send a session request to the access and mobility management function (AMF), the AMF may select the session management function (SMF), and the SMF may select a user plane function (UPF) to support a protocol data unit (PDU) session between the UE and a data network. The PDU session allows the UE to send data to and receive data from the data network. The UPF may provide an interconnect point between the mobile network infrastructure and the data network, and may be involved in functions such as packet routing and forwarding, and quality of service (QoS) handling. In 4G long-term evolution (LTE) networks, the packet gateway (PGW) function may perform comparable functions to the SMF and the UPF in 5G networks. The mobility management entity (MME) may select the PGW for establishment of an evolved packet switched (EPS) bearer to allow the UE to send data to and receive data from the data network.

Wireless communication networks, including 5G networks and 4G LTE networks, may have different sets of user plane functions or PGWs with different throughput or data speed capabilities. For instance, in 5G networks, some user plane functions may have high throughput capabilities but may be costly to operate from the network perspective, while other user plane functions may have lower operation costs and lower throughput capabilities. In addition, some UEs may not be able to exceed certain throughput values. The throughput capabilities of a UE may be limited by various parameters such as the subscriber's rate plan, the device model of the UE, and/or fair usage policies which may place restrictions on the subscriber's network usage at certain times. For example, some legacy handsets may not be capable of crossing certain high throughput values, while subscriber rate plans may restrict usage to certain throughput limits. The selection of a high throughput user plane function for a UE with low throughput demands may be a wasteful use of costly network infrastructure.

As UE data throughput limits may vary, there is a need for improved methods for selecting the user plane function (e.g., UPF in 5G, or PGW in 4G LTE) to support UE sessions that takes throughput parameters into account.

SUMMARY

Embodiments disclosed herein provide a technical solution to the problem of selecting a user plane function for a UE session based on throughput parameters, such that higher throughput user plane functions are reserved for UEs having higher throughput demands. In one embodiment, a computer-implemented method for selecting a user plane function for a data or voice session when a user equipment (UE) attaches to a wireless communication network may include receiving a session request from the UE and, at a computer system associated with a management function of the wireless communication network, determining a data throughput limit associated with the UE, identifying a first user plane function having a first data throughput capacity, and identifying a second user plane function having a second data throughput capacity, wherein the first data throughput capacity is higher than the second data throughput capacity. The method may further include selecting the first user plane function if the data throughput limit of the UE is above a predetermined threshold, selecting the second user plane function if the data throughput limit of the UE is below the predetermined threshold, and sending a session request to the selected first or second user plane function. The method may further include establishing the data or voice session between the UE and a data network via the selected first or second user plane function.

In another embodiment, a system may include a user equipment (UE), a wireless communication network including a random access network (RAN) and a core network, and a management function in the core network including a computer system. The computer system of the management function may include a processor, a memory, and an input-output circuit. The processor may be configured according to computer-executable instructions for determining a data throughput limit associated with the UE when the UE attempts to attach to the wireless communication network, determining a data throughput capacity of a first user plane function in the wireless communication network, and determining a data throughput capacity of a second user plane function in the wireless communication network, wherein the data throughput capacity of the first user plane function is higher than the data throughput capacity of the second user plane function. The processor may be further configured according to computer-executable instructions for selecting the first user plane function if the data throughput limit of the UE is above a predetermined value, selecting the second user plane function if the data throughput limit of the UE is below the predetermined value, and sending a session request to the selected first or second user plane function to establish a session between the UE and a data network.

BRIEF DESCRIPTION OF THE DRAWINGS

The disclosure may be better understood by reference to the detailed description when considered in connection with the accompanying drawings. The components in the figures are not necessarily to scale, emphasis instead being placed upon illustrating the principles of the disclosure.

DETAILED DESCRIPTION

Figure 1:
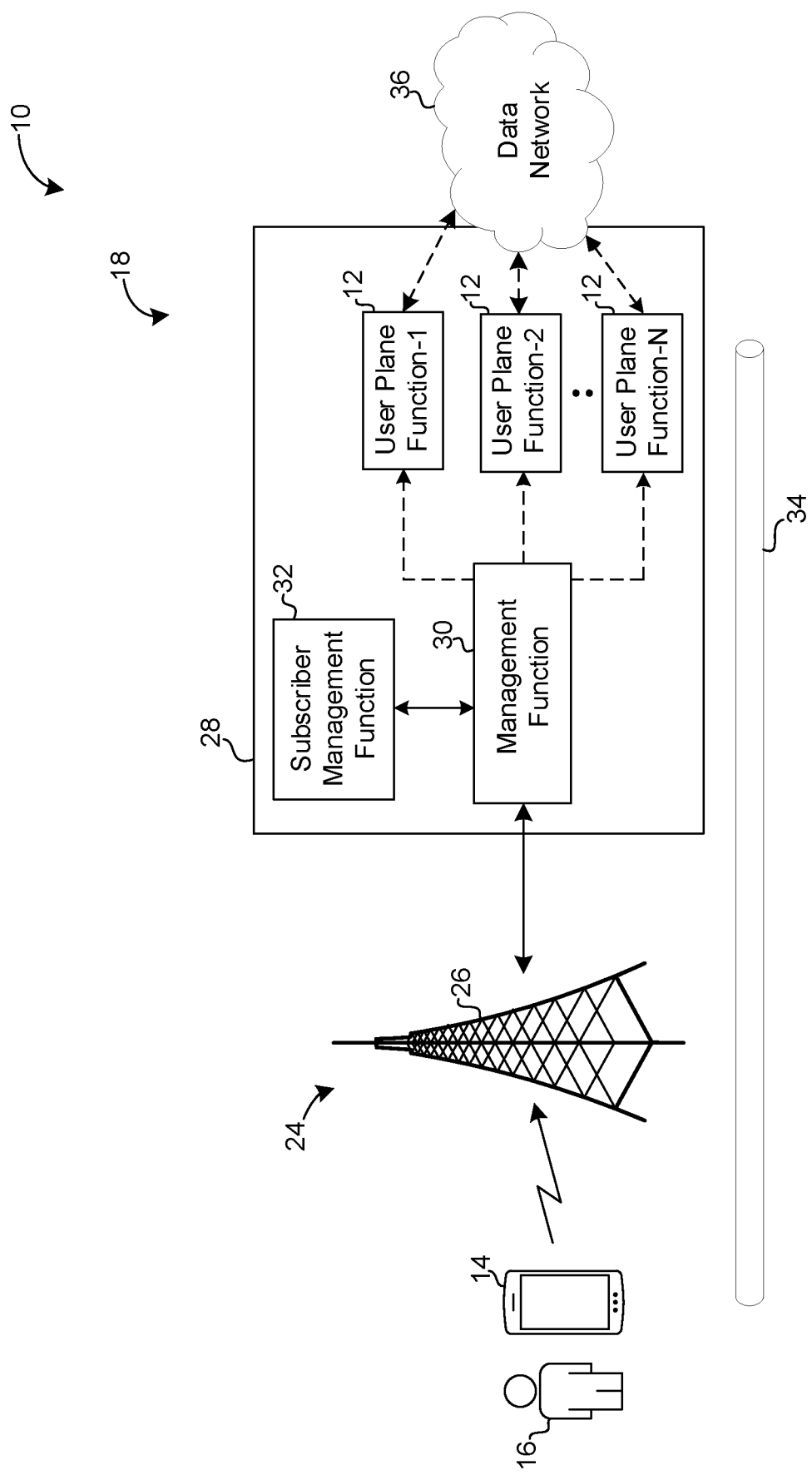
FIG. 1 is a schematic representation of a system for selecting a user plane function when a user equipment (UE) attaches to a wireless communication network, according to one embodiment.

Referring now to the drawings and with specific reference to FIG. 1, a system 10 for selecting a user plane function 12 when a user equipment (UE) 14 of a subscriber 16 attempts to attach to a wireless communication network 18 is shown. As detailed more specifically below, the wireless communication network 18 may be a 5G network 20 (see FIG. 3), a 4G long-term evolution (LTE) network 22 (see FIG. 4), or a cellular network of another generation. The wireless communication network 18 may include a radio access network (RAN) 24 including a base station 26, and a core network 28 including a plurality of user plane functions 12, a management function 30 involved in selection of the user plane function 12, and a subscriber management function 32 which carries subscriber information and rate plan information for the UE 14.

The user plane function 12 may be involved in establishment of a session 34 between the UE 14 and a data network 36 (e.g., the Internet or IP Media Subsystem (IMS)), allowing the UE 14 to send data to and receive data from the data network 36, such as during a voice call or while browsing the Internet. The user plane functions 12 may have different throughput capacities related to their respective data processing speeds. The number of user plane functions 12 available for selection may vary depending on the network architecture. In one non-limiting embodiment, the network 18 may include hundreds of user plane functions 12. As used herein, the user plane function 12 may include a user plane function (UPF) in 5G, a packet gateway function (PGW) in 4G LTE, or a comparable network function of another cellular network generation. Additionally, as used herein, the management function 30 may include a session management function (SMF) in 5G, a mobility management entity (MME) in 4G LTE, or a comparable network function of another cellular network generation.

As explained further below, the management function 30 may select an appropriate user plane function 12 for establishment of the session 34 based on a limit in a data throughput value of the UE 14 and the throughput capabilities of the user plane functions 12. The management function 30 may obtain information related to the data throughput limit of the UE 14 from the subscriber management function 32. If the limit in the data throughput value of the UE 14 is determined to be low (below a threshold value), the management function 30 may select a user plane function 12 with a lower throughput capacity. If the limit in the data throughput value is determined to be high (above the threshold value), the management function 30 may select a user plane function 12 with a higher throughput capacity. This allows the network 18 to place UEs 14 with lower data throughput values with lower throughput user plane functions 12, reserving more costly higher throughput user plane functions 12 for UEs 14 likely to have higher throughput demands.

Figure 2:
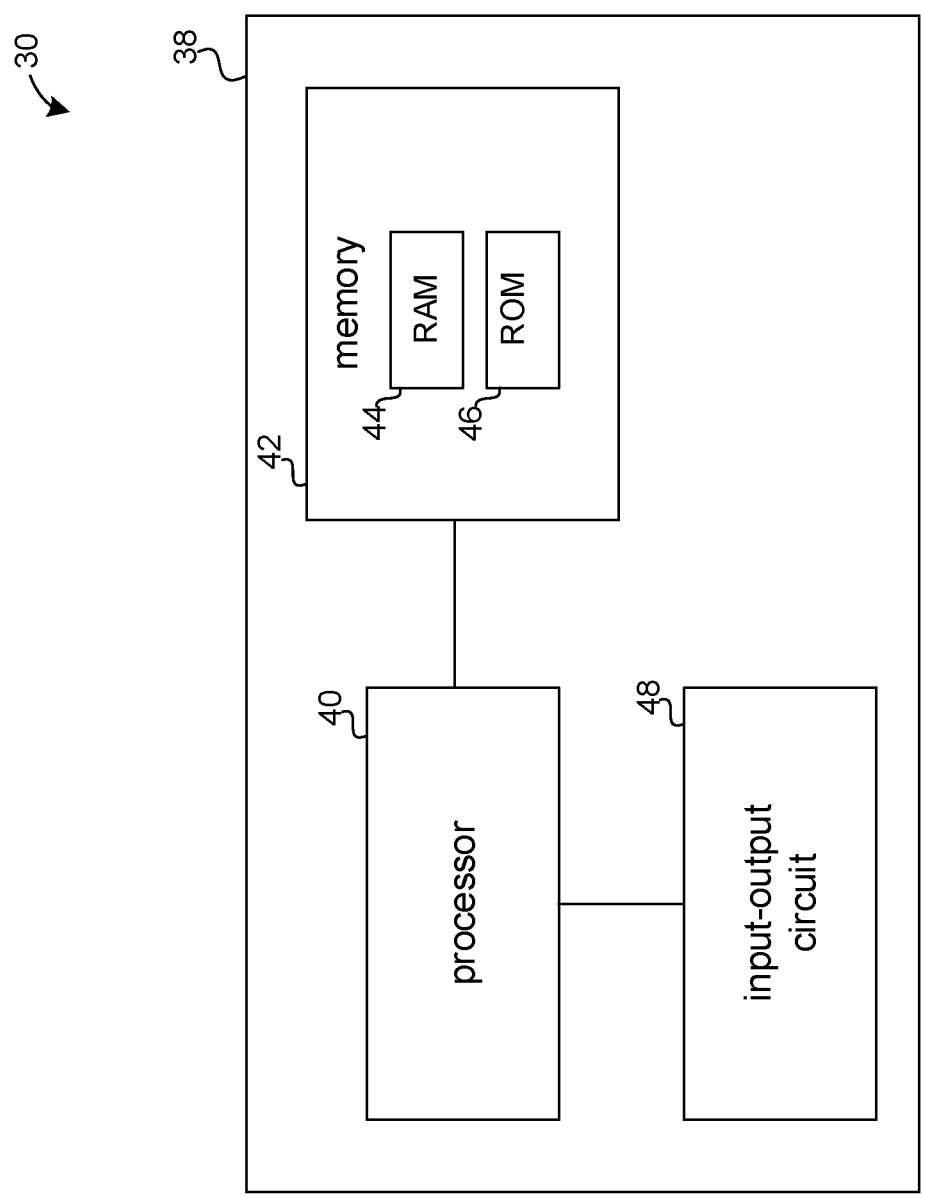
FIG. 2 is a schematic representation of a computer system of a management function of the system of FIG. 1, according to one embodiment.

A schematic representation of a computer system 38 of the management function 30 is shown in FIG. 2. The computer system 38 may include one or more processors 40 configured according to computer-executable instructions involved in selection of the user plane function 12. The computer system 38 may further include a memory 42 configured to store the computer-executable instructions and assist the processor 40. The memory 42 may include a random access memory (RAM) 44, or volatile memory for temporary storage, and a read-only memory (ROM) 46, or non-volatile memory for permanent storage. An input-output circuit 48 of the computer system 38 may enable the computer system 38 to communicate with other entities of the network 18, such as the user plane functions 12 and the subscriber management function 32.

Figure 3:
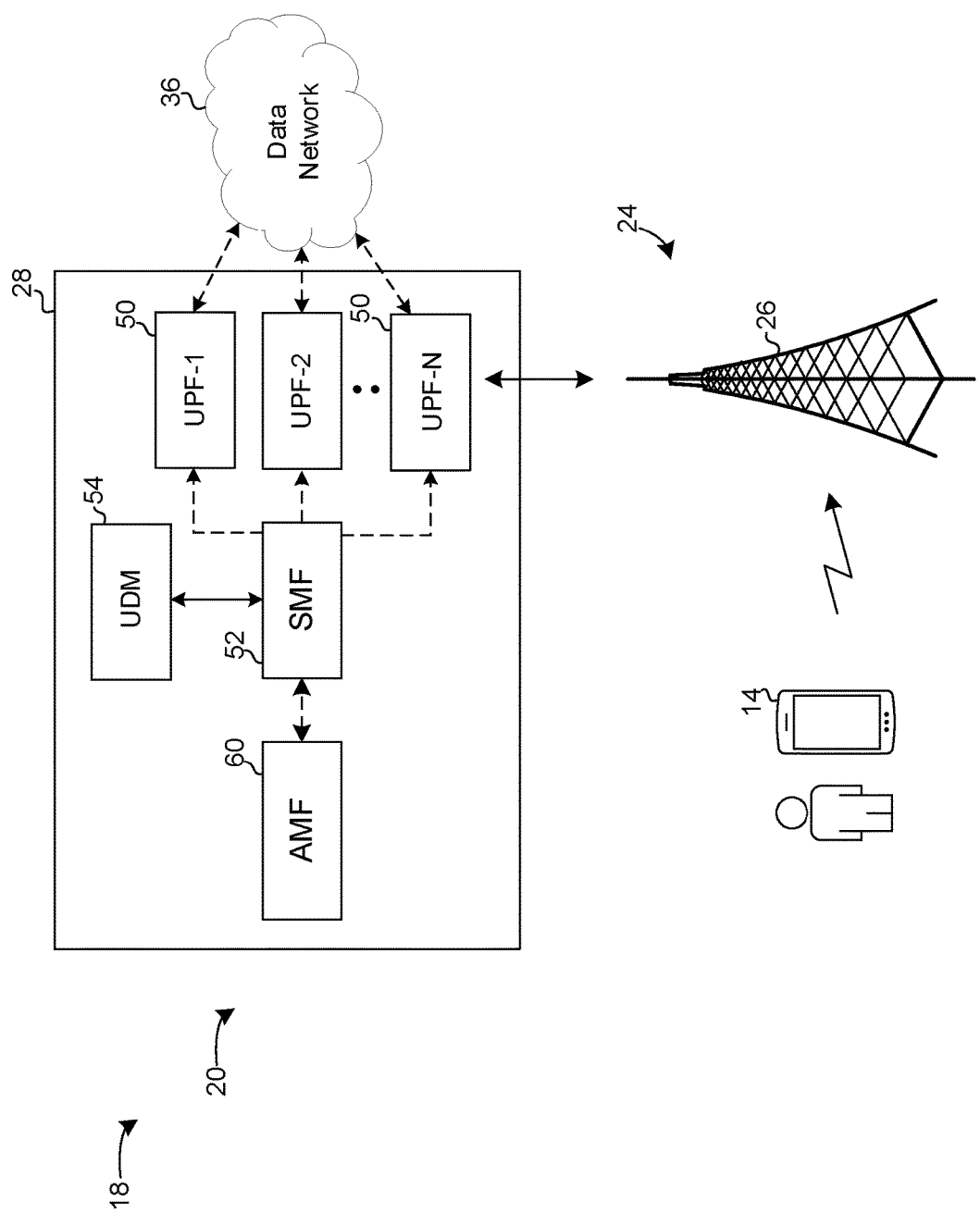
FIG. 3 is a schematic representation of the system of FIG. 1 when the wireless communication network is a 5G network, according to one embodiment.

FIG. 3 shows an embodiment of the system 10 when the wireless communication network 18 is a 5G network 20. In this arrangement, the user plane functions 12 are UPFs 50, the management function 30 is an SMF 52, and the subscriber management function 32 is a unified data management function (UDM) 54. The 5G network 20 may include an access network 24 (including the base station 26 or gNodeB), and the core network 28. Among other entities not shown for clarity, the core network 58 may include an access and mobility management function (AMF) 60, the SMF 52, the UDM 54, and the UPFs 50 having variable throughput capacities.

When the UE 14 attempts to attach to the network 20, it may send a session request to the AMF 60, and the AMF 60 may select the SMF 52. The SMF 52 may communicate with the UDM 54 to obtain subscription information and other information about the UE 14, and begin the process of selecting an appropriate UPF 50 to support the session 34. The UPFs 50 may inform the SMF 52 of their respective throughput capabilities. For example, each UPF 50 may communicate one or more signals to the SMF 52 informing the SMF 52 of whether the respective UPF 50 is a low throughput UPF (with a throughput capacity below a threshold value), or a high throughput UPF (with a throughput capacity above a threshold value).

Based on the information obtained from the UDM 54, the SMF 52 may determine a data throughput limit for the UE 14. The data throughput limit may be limited based on the subscriber's rate plan, a device model of the UE 14, or other parameters such as fair usage policies. If the data throughput limit of the UE 14 is above a predetermined threshold, the SMF 52 may select a high throughput UPF 50 for establishment of the session 34. If, on the other hand, the data throughput limit of the UE 14 is below the predetermined threshold, the SMF 52 may select a low throughput UPF for establishment of the session 34.

Figure 4:
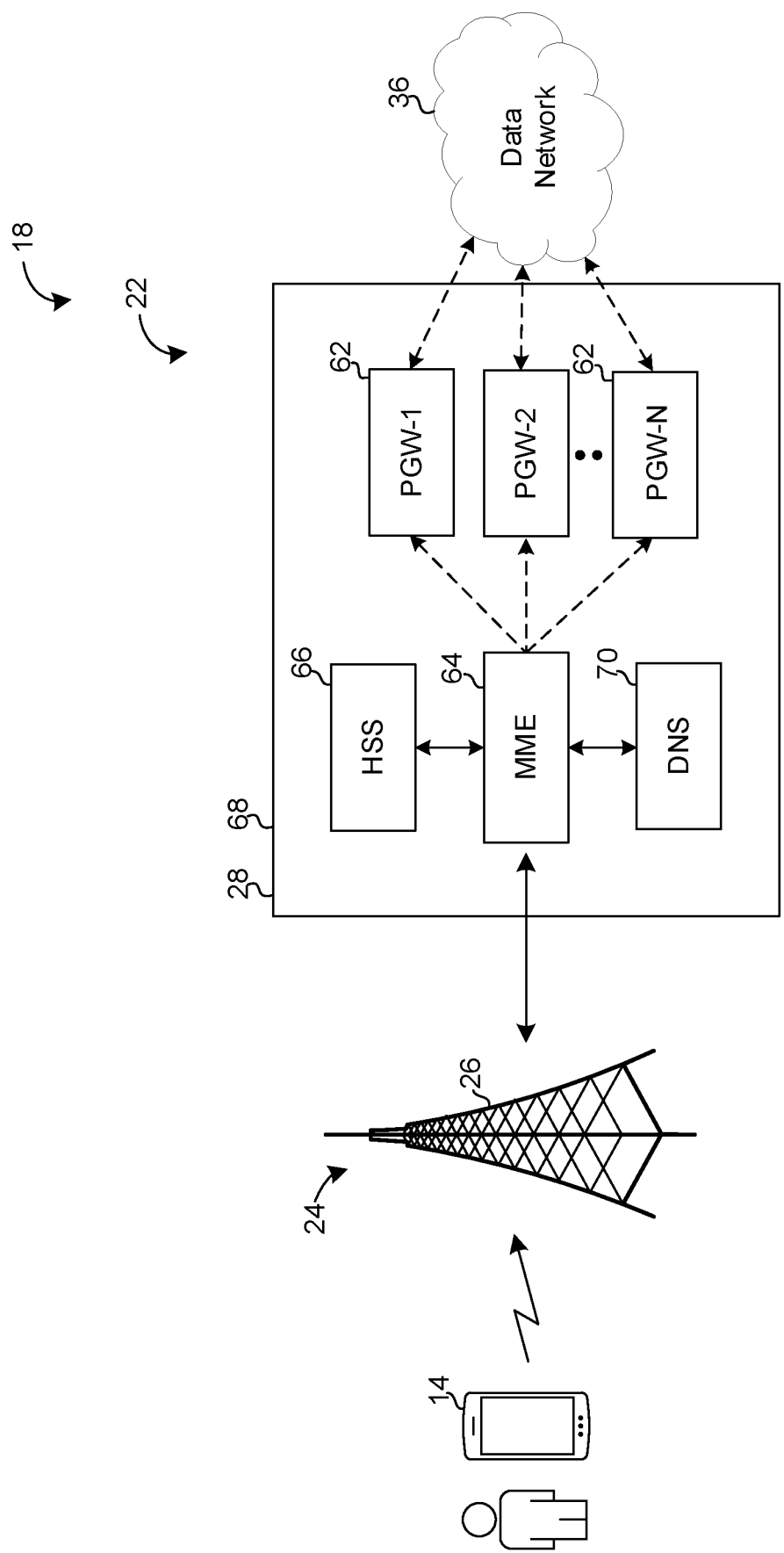
FIG. 4 is a schematic representation of the system of FIG. 1 when the wireless communication network is a 4G long-term evolution (LTE) network, according to one embodiment.

An embodiment of the system 10 when the wireless communication network 18 is a 4G LTE network 22 is shown in FIG. 4. In the context of the 4G LTE network 22, the user plane functions 12 are PGWs 62, the management function 30 is the mobility management entity (MME) 64, and the subscriber management function 32 is a home subscriber server (HSS) 66. In some embodiments of the 4G LTE network 22 having control and user plane separation in place, the PGWs 62 for selection may be user plane PGWs (PGW-Us). The 4G LTE network 22 may include the radio access network 24 (including the base station 26 or eNodeB), and the core network 28 referred to as the evolved packet core (EPC) 68. Among other elements not shown for clarity, the EPC 68 may include the MME 64, the HSS 66, a domain name server (DNS) 70, and the PGWs 62 having different throughput capacities. The MME 64 may apply logic to select the PGW 62 for creating the session 34 as described below.

When the UE 14 attempts to attach to the network 22, the MME 64 may receive a session request from the base station 26. The MME 64 may query the HSS 66 to obtain subscription information and other information for the UE 14 to determine the data throughput limit of the UE 14. The MME 64 may also query the DNS 70 to obtain throughput capacity information for each of the available PGWs 62. The throughput capacity information for the PGWs 62 may indicate whether each available PGW 62 is a low throughput PGW with a throughput capacity below a threshold value, or a high throughput PGW with a throughput capacity above a threshold value. If the UE 14 has a low data throughput limit (below a predetermined threshold), the MME 64 may select a matching low throughput capacity PGW 62 to create the session 34. Alternatively, if the UE 14 has a high data throughput limit (above a predetermined threshold), the MME 64 may select a matching high throughput capacity PGW 62 to create the session 34. In some embodiments of the 4G LTE network having control and user plane separation, this logic may be applied by the PGW-C instead of the MME 64 for selection of a PGW-U.

Figure 5:
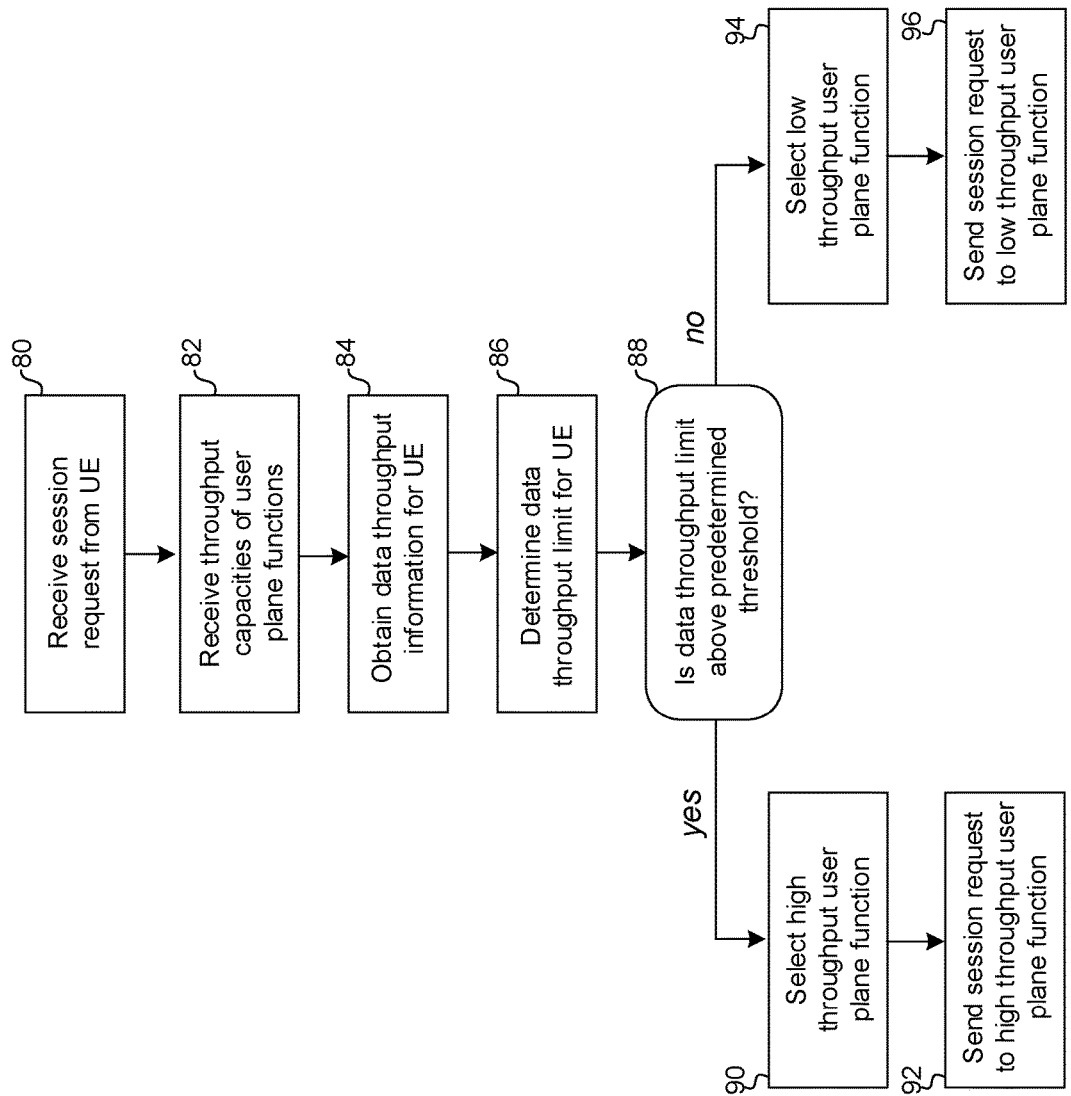
FIG. 5 is a flow chart of an exemplary computer-implemented method for selecting a user plane function when the UE attaches to the wireless communication network, according to one embodiment.

Turning to FIG. 5, a computer-implemented method for selecting the user plane function 12 when the UE 14 attaches to the network 18 is shown. The method may be performed by the processor 40 of the management function 30 of FIG. 2. The method of FIG. 5 encompasses UE attachment in the 5G network 20, the 4G LTE network 22, or a cellular network of another generation. At a first block 80, the management function 30 may receive a session request when the UE 14 attempts to attach to the network 18. At a block 82, the management function 30 may receive information regarding the throughput capacities of each of the user plane functions 12 available for creation of the session 34. For instance, in the 5G network 20, the UPFs 12 may inform the SMF 52 of their respective throughput capacities. In the 4G LTE network 22, the MME 64 may obtain information regarding the throughput capacities of the PGWs 62 from the DNS 70 or another network function. The user plane functions 12 may be classified or ranked according to their throughput capacities, with those user plane functions 12 having throughput capacities below a threshold value being classified as low throughput user plane functions, and those user plane functions 12 having throughput capacities above a threshold value being classified as high throughput user plane functions. This classification may be made at the management function 30, or at other functions of the network 18 (e.g., the user plane functions, the DNS, etc.). The threshold values which classify the user plane functions 12 as low or high throughput may vary depending on the design of the network 18.

At blocks 84 and 86, the management function 30 may determine the data throughput value limit for the UE 14 by querying the subscriber management function 32, and determining the data throughput limit based on the information obtained in response to the query. The information may include details in the subscriber's rate plan, information regarding the device model of the UE 14, and/or any fair usage policies applied to the UE 14. For instance, the subscriber's rate plan may have a certain data speed limit such as 1 gigabits per second (Gbps) or 5 Gbps. In one embodiment, information regarding the device model of the UE 14 may be obtained from an international mobile equipment identity (IMEI) number of the UE 14. The block 86 may involve determining whether the data throughput of the UE 14 is limited by the rate plan associated with the UE 14, the device model of the UE 14, or any other factors that may limit the data speed of the UE 14 such as fair use policies, the location of the UE 14, how many customers are using the same cell site, or device software and number of applications on the UE 14. In one example, the UE 14 may have a high speed rate plan but may be a legacy handset limited to a lower data throughput limit. In this case, the data throughput limit of the UE 14 is determined based on the data speed limit of the device model which is the limiting parameter. In another example, the UE 14 may be a newer handset capable of high throughput values, but the subscriber rate plan may be limited to lower data speeds. In the latter case, the data throughput limit of the UE 14 is determined based on the data speed limit in the subscriber rate plan which is the limiting parameter.

If the data throughput limit of the UE 14 is above a predetermined threshold (as assessed at a block 88), the management function 30 may select a high throughput user plane function 12 for the session 34, and send a session request to the selected high throughput user plane function 12 (blocks 90 and 92). If, however, the data throughput limit of the UE 14 is below the predetermined threshold (as assessed at the block 88), the management function 30 may select a low throughput user plane function 12 for the session 34, and send a session request to the selected low throughput user plane function 12 (blocks 94 and 96).

Figure 6:
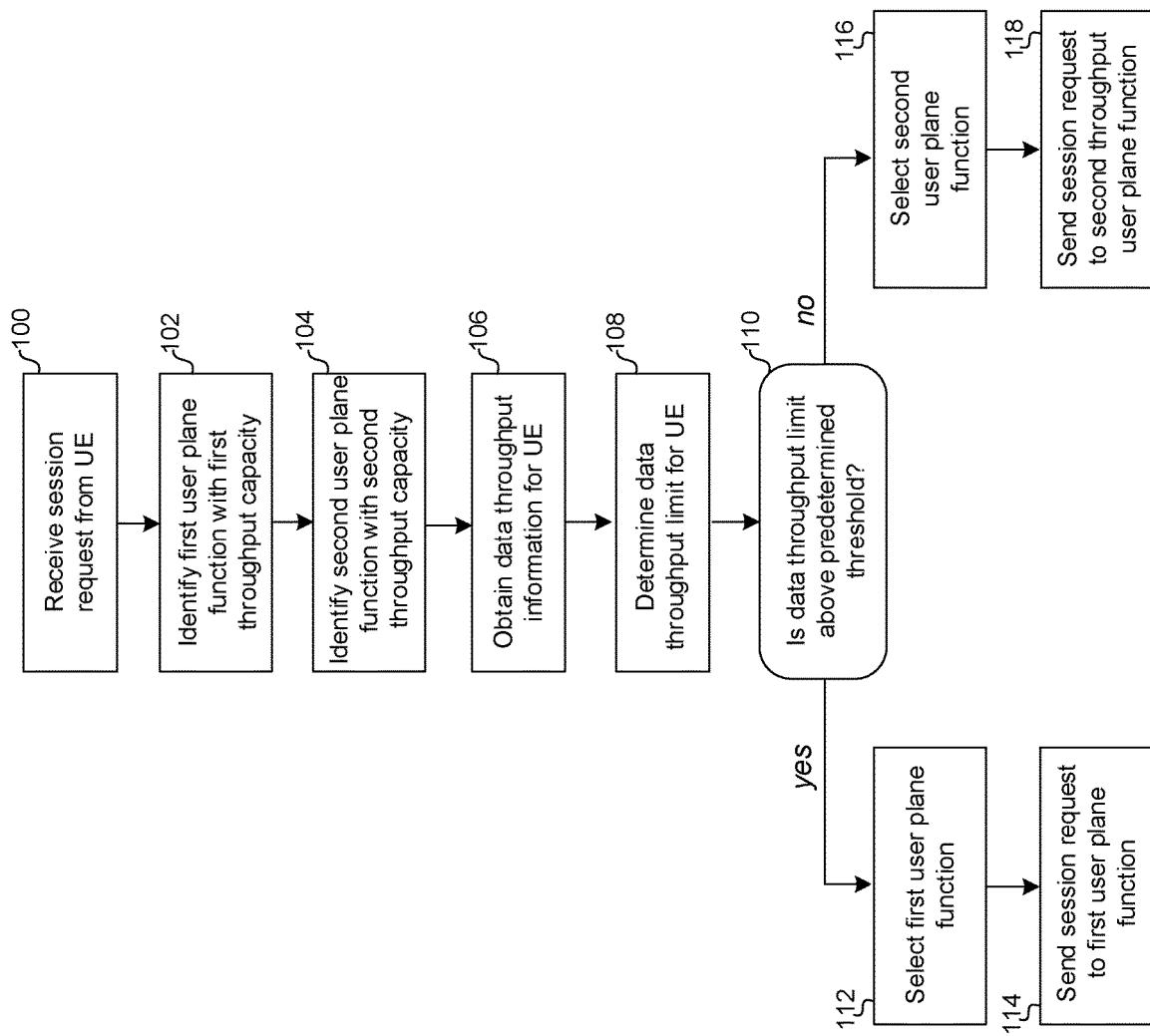
FIG. 6 is a flow chart of another exemplary computer-implemented method for selecting a user plane function when the UE attaches to the wireless communication network, according to another embodiment.

Another computer-implemented method for selecting the user plane function 12 as performed by the processor 40 of the management function 30 is shown in FIG. 6. The method may be performed in the context of the 5G network 20, the 4G LTE network 22, or a cellular network of another generation. At a first block 100, the management function 30 may receive a session request when the UE 14 attempts to attach to the network. At blocks 102 and 104, the management function 30 may identify a first user plane function 12 with a first user throughput capacity (block 102), and a second user plane function 12 with a second user throughput capacity (block 104), wherein the first user plane function 102 has a higher throughput capacity than the second user plane function 104. For example, in the context of the 5G network 20, the first and second user plane functions 102 and 104 may be identified by signals received from the UPFs 50 informing the SMF 52 of their respective throughput capacities. Alternatively, in the context of the 4G LTE network 22, the MME 64 may query the DNS 70 or another network function for the throughput capacities of the PGWs 62.

At a block 106, the management function 30 may obtain data throughput information for the UE 14 by querying the subscriber management function 32. The information may include the throughput limit in the subscriber's rate plan, the device model of the UE 14 (which may be determined based on the IMEI tag of the UE 14), and/or any fair usage policies applied to the UE 14. The management function 30 may also obtain additional information which may be applicable to determining the data throughput limit of the UE 14, such as the location of the UE 14, the number of other customers using the same cell site, and/or the software or applications installed on the UE 14. Such additional information may be gathered via the subscriber management function 32 (e.g., the UDM 54 or the HSS 66), via information at the management function 30 itself, or from another function of the network. Based on the gathered information, the management function 30 may determine a data throughput limit for the UE 14 (block 108). As explained above, the block 108 may involve determining a limiting parameter which restricts the UE 14 from surpassing a certain throughput value (e.g., rate plan, device model, etc.), and determining the data throughput limit based on the limiting parameter.

If the data throughput limit of the UE 14 is above a predetermined threshold (as assessed at a block 110), the management function 30 may select the first user plane function 12 having the higher throughput capacity for establishing the session 34 (block 112). The management function 30 may then send a session request to the first user plane function 12 to establish the session 34 between the UE 14 and the data network 36 (block 114). If, on the other hand, the data throughput limit of the UE 14 is below the predetermined threshold (as assessed at the block 110), the management function 30 may select the second user plane function 12 having the lower throughput capacity for establishing the session 34 (block 116). A session request may then be sent to the second user plane function 12 to establish the session 34 between the UE 14 and the data network 36 (block 118). It will be understood that the order of the steps in FIGS. 5-6 is exemplary, and that the steps may be carried out in different orders or simultaneously in practice.

In other embodiments, the user plane functions 12 may have a range of classifications with more granularity, such as low, medium, and high throughput user plane functions. In such embodiments, the management function 30 may apply logic to match the data throughput limit of the UE 12 to a user plane function having a compatible throughput capacity whether it be low, medium, or high. In yet other embodiments, the management function 30 may match the data throughput value limit of the UE 14 to a user plane function 12 having a compatible throughput capacity based on raw or treated numbers of the respective throughput capabilities. Additionally, in yet other embodiments, the management function 30 may select the user plane function 12 based on the current load on the available user plane functions 12. If, for example, the UE 14 has a high data throughput value limit, the management function 30 may select a user plane function 12 which is currently serving fewer UEs to establish the session for the UE 14, regardless of the throughput capacity of the user plane function 12. In some embodiments, the management function 30 may take into account both the throughput capacities and the current load on the user plane functions 12 when making its selection.

As is encompassed by the embodiments of FIGS. 1 and 5-6, the concepts of the present disclosure may be extended to include selection of comparable user plane functions involving cellular network generations that are not yet developed. In such situations, the concept of selecting the user plane function based on the data throughput limit of the UE and the throughput capacity of the user plane function may still apply.

The present disclosure provides a technical solution to the problem of selecting more costly user plane functions for UEs with lower throughput limits. According to the present disclosure, UEs having lower throughput limits may be sent to user plane functions having lower throughput capacities. In this way, the lower throughput user plane functions may serve more UEs, reserving the more costly higher throughput user plane functions for UEs having higher throughput demands. A parameter (rate plan, UE model, etc.) which restricts the UE from crossing certain throughput parameters may be identified to determine the data throughput limit of the UE. A user plane function with a compatible throughput capability (e.g., low, high, etc.) is then selected for establishment of the session.

What is claimed is:

1. A computer-implemented method for selecting a user plane function for a data or voice session when a user equipment (UE) attaches to a wireless communication network, comprising:

receiving a session request from the UE;
at a computer system associated with a management function of the wireless communication network,
determining a data throughput limit associated with the UE,
identifying a first user plane function having a first data throughput capacity,
identifying a second user plane function having a second data throughput capacity, the first data throughput capacity being higher than the second data throughput capacity,
selecting the first user plane function if the data throughput limit of the UE is above a predetermined threshold,
selecting the second user plane function if the data throughput limit of the UE is below the predetermined threshold, and
sending a session request to the selected first or second user plane function; and
establishing the data or voice session between the UE and a data network via the selected first or second user plane function.

2. The computer-implemented method of claim 1, wherein determining the data throughput limit associated with the UE includes determining the data throughput limit based on a rate plan of the UE.

3. The computer-implemented method of claim 1, wherein determining the data throughput limit associated with the UE includes determining the data throughput limit based on a device model of the UE.

4. The computer-implemented method of claim 1, wherein determining the data throughput limit associated with the UE includes determining the data throughput limit based on a fair usage policy associated with the UE.

5. The computer-implemented method of claim 1, wherein the wireless communication network is a 5G network, and wherein the management function is a session management function (SMF).

6. The computer-implemented method of claim 5, wherein determining the data throughput limit associated with the UE includes querying a user data management (UDM) function of the 5G network for a data throughput limit in a rate plan for the UE.

7. The computer-implemented method of claim 1, wherein the wireless communication network is a 4G long-term evolution (LTE) network, and wherein the management function is a mobility management entity (MME).

8. The computer-implemented method of claim 7, wherein the user plane function is a packet data network gateway function (PGW).

9. The computer-implemented method of claim 7, wherein determining the data throughput limit associated with the UE includes querying a home subscriber server (HSS) function of the 4G LTE network for a data throughput limit in a rate plan for the UE.

10. A system, comprising:
a user equipment (UE);
a wireless communication network including a random access network (RAN) and a core network; and
a management function in the core network including a computer system, the computer system including a processor, a memory, and an input-output circuit, the processor being configured according to computer-executable instructions for:
determining a data throughput limit associated with the UE when the UE attempts to attach to the wireless communication network, determining a data throughput capacity of a first user plane function in the wireless communication network, determining a data throughput capacity of a second user plane function in the wireless communication network, the data throughput capacity of the first user plane function being higher than the data throughput capacity of the second user plane function, if the data throughput limit of the UE is above a predetermined value, selecting the first user plane function, if the data throughput limit of the UE is below the predetermined value, selecting the second user plane function, and sending a session request to the selected first or second user plane function to establish a session between the UE and a data network.

11. The system of claim 10, wherein the wireless communication network is a 5G network, and wherein the management function is a session management function (SMF).

12. The system of claim 11, wherein determining the data throughput limit associated with the UE includes querying a user data management (UDM) function of the core network for a data throughput limit in a rate plan for the UE.

13. The system of claim 11, wherein determining the data throughput limit associated with the UE includes determining the data throughput limit based on a device model of the UE.

14. The system of claim 11, wherein determining the data throughput limit associated with the UE includes determining the data throughput limit based on an international mobile equipment identity (IMEI) number of the UE.

15. The system of claim 10, wherein the wireless communication network is a 4G long-term evolution (LTE) network, and wherein the management function is a mobility management entity (MME).

16. The system of claim 15, wherein determining the data throughput limit associated with the UE includes querying a home subscriber server (HSS) of the core network for a data throughput limit in a rate plan for the UE.

17. The system of claim 15, wherein the user plane function is a packet data network gateway (PGW) function.

18. A computer-implemented method for selecting a user plane function when a user equipment (UE) attaches to a wireless communication network, comprising:

receiving a session request from the UE; and at a computer system associated with a management function of a core network of the wireless communication network, determining a data throughput limit of the UE, receiving an indication of throughput capacities for each of a plurality of user plane functions associated with the wireless communication network, the indication informing the management function whether each respective user plane function is at least one of a low throughput user plane function having a throughput capacity below a threshold value or a high throughput user plane function having a throughput capacity above a threshold value, selecting one of the low throughput user plane functions or one of the high throughput user plane functions for the session based on the data throughput limit of the UE, and sending a session request to the selected low throughput user plane function or high throughput user plane function.

19. The computer-implemented method of claim 18, wherein determining the data throughput limit of the UE includes determining the data throughput limit based on a rate plan of the UE.

20. The computer-implemented method of claim 18, wherein determining the data throughput limit of the UE includes determining the data throughput limit based on a device model of the UE.

* * * * *